F. THOMPSON & W. H. WILLIAMSON.
Apparatus for Purifying and Assorting Semolino, &c.
No. 226,808.  Patented April 20, 1880.
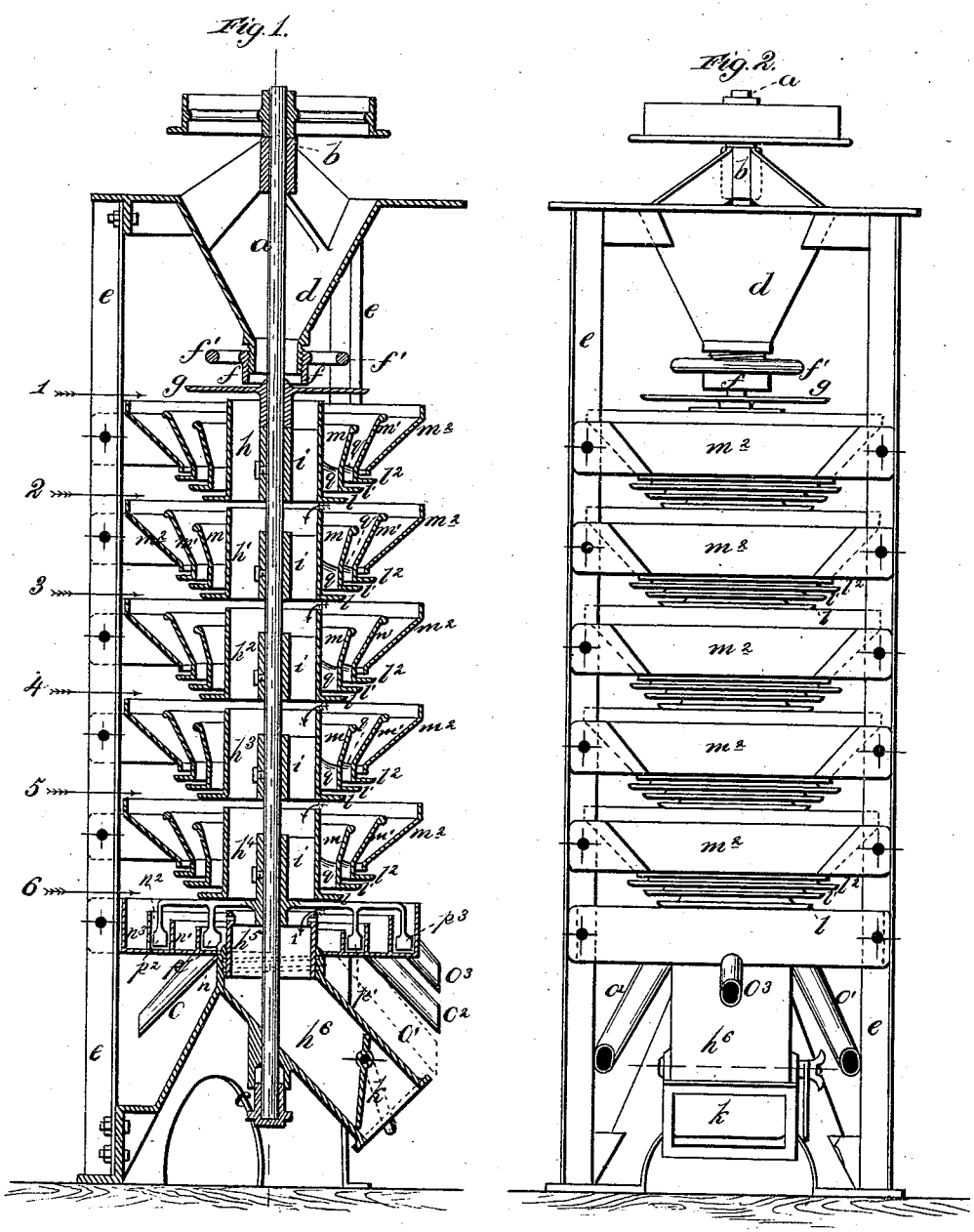

UNITED STATES PATENT OFFICE.

FREDERICK THOMPSON AND WILLIAM H. WILLIAMSON, OF WAKEFIELD, GREAT BRITAIN.

APPARATUS FOR PURIFYING AND ASSORTING SEMOLINO, &c.

SPECIFICATION forming part of Letters Patent No. 226,808, dated April 20, 1880.

Application filed January 21, 1880.

*To all whom it may concern:*

Be it known that we, FREDERICK THOMPSON and WILLIAM HENRY WILLIAMSON, both of Wakefield, in the county of York, Kingdom of Great Britain and Ireland, have invented new and useful Improvements in Machinery or Apparatus for Purifying and Assorting Semolino, Middlings, Corn, and other matters, of which the following is a specification.

This invention has reference to improvements in machinery or apparatus of the class described in the specification of Letters Patent granted to us the 8th day of July, 1879, No. 217,430, for purifying and assorting semolino, middlings, corn, and other matters.

According to our present invention we cause each of a series of single currents of air, while on its way to the central air space, passage, or chamber of the machine, to pass centripetally through, traverse, and act upon several streams or showers of semolino or other matters descending or falling from a number of annular centrifugal distributers arranged one within another.

Figure 1 of the accompanying drawings is a vertical section of a machine embodying our present improvements. Fig. 2 is an outside view of the same machine.

$a$ is the spindle or shaft, working in a guide-bearing, $b$, and step $c$. $d$ is a hopper secured to the standards $e$. $f$ is a tubular valve or mouth-piece, internally screwed, and adjustable on the lower end of the hopper $d$ by the hand-wheel $f'$. $g$ is a centrifugal distributer fixed on the spindle or shaft $a$. $h$, $h'$, $h^2$, $h^3$, $h^4$, and $h^5$ are pipes constituting the compound central air space, passage, or chamber of the machine. These pipes, in the arrangement illustrated, are secured by cross-pieces $i$ to the spindle or shaft $a$.

1, 2, 3, 4, 5, and 6 are spaces for admitting air into the compound central air space, passage, or chamber, which communicates, by a pipe or passage, $h^6$, provided with a regulating-valve, $k$, with any suitable fan or exhauster.

Each portion or length of pipe, except the lowest one, $h^5$, of the compound central air space, passage, or chamber is provided with a number of annular centrifugal distributers, $l$ $l'$ $l^2$, and with hoppers $m$ $m'$ $m^2$, as shown. In the arrangement shown these annular distributers and hoppers rotate with the spindle or shaft $a$, except the hoppers $m^2$, which are supported by the standards $e$. The hoppers $m$ and $m'$ may also be supported from these, the distributers rotating without them.

Around the lowest length of pipe, $h^5$, are arranged annular receivers or collecting-trays $n$ $n'$ $n^2$ $n^3$, with spouts $o$ $o'$ $o^2$ $o^3$.

$p$ $p'$ $p^2$ $p^3$ are sweepers, which travel in the annular receivers or collecting-trays, for the purpose hereinafter mentioned.

The material to be treated, having been delivered into the hopper $d$, is by it fed (in quantities regulated by adjusting the tubular valve or mouth-piece $f$) upon the distributer $g$. This distributer throws the material centrifugally outward, and the material thus distributed is subjected to a current of air, 1, drawn centripetally to the air-chamber $h$ by the action of the fan or exhauster applied at the bottom of the machine. The lighter matters, winnowed out at this stage, fall, according to their different specific gravities, into the rotating hoppers $m'$ or $m$, and thence to the distributers $l'$ or $l$, which, with the outer distributer, $l^2$, are connected together by radial ribs $q$, as shown. Three ribs may conveniently be used to each. The heavier matters, falling into the hopper $m^2$, are again distributed by the distributer $l^2$, and this distribution will take place at the same time that lighter matters which have descended by the hoppers $m'$ and $m$ are being distributed by the inner distributers, $l'$ and $l$. Consequently the current of air drawn in at 2 will be caused to traverse each of the several veils or showers of material falling one within another, and will thus carry with it the comparatively light matters from each veil or shower, and cause the same to pass either into a more inward hopper, or, in the case of the lightest matters of all, will carry them into the central air space, passage, or chamber.

From this explanation it will be understood that the heavier matters descending at each stage will fall into the outer hoppers of the next stage, and comparatively light matters will be carried inward from each veil or shower.

The number of stages, as also the number of hoppers and annular distributers, arranged one within another, as described, may be varied to suit circumstances. The several streams of heavy and comparatively light matters, after undergoing the series of cleaning operations, (which depends in number on the number of cleaning-stages in the machine,) will be deposited according to their relative specific gravity in the annular receivers or collecting-trays $n\ n'\ n^2\ n^3$, the heaviest being deposited in the receiver or tray $n^3$, the next in $n^2$, the next in $n'$, and the lightest in $n$, and in these trays the treated matters will be swept by the sweepers $p\ p'\ p^2\ p^3$ to the spouts $o\ o'\ o^2\ o^3$, and thereby conducted into any suitable receptacles.

The machine may be modified by making all the parts stationary except the spindle, the sweepers, and the uppermost distributer. In this arrangement the hoppers $m\ m'$, the distributers $l\ l'\ l^2$, and the lengths of pipe $h\ h'\ h^2\ h^3\ h^4$ may be connected by radial ribs to the outer hoppers, $m^2$.

What we claim as our invention is—

1. In a machine for purifying and assorting semolino and other matters, the combination of annular centrifugal distributers arranged one within another, a central air space, passage, or chamber, and means for exhausting therefrom, the whole so arranged as to centrifugally distribute the matters under treatment in a series of veils or showers at several stages, and cause all the veils or showers of each of the said stages to be traversed by a current of air on its way to the central air space, passage, or chamber, substantially as described, for the purposes specified.

2. In a machine for purifying and assorting semolino and other matters, the combination, with a central air space, passage, or chamber, means for exhausting air therefrom, and annular centrifugal distributers arranged one within another, of hoppers arranged one within another, so as to receive matters that have been acted on by a current of air drawn centripetally through a series of veils or showers, and to feed such matters to the said annular centrifugal distributers, substantially as and for the purpose specified.

3. A machine for purifying and assorting semolino and other matters, comprising a main spindle or shaft, $a$, carrying a centrifugal distributer, $g$, a hopper, $d$, with adjustable tubular valve $f$, for feeding matters to be treated onto said distributer, a compound central air space, passage, or chamber composed of pipes $h\ h'\ h^2\ h^3\ h^4\ h^5$, with air-spaces at 1, 2, 3, 4, 5, and 6, and a valve, $k$, and means for exhausting air from said compound central air space, passage, or chamber, hoppers $m\ m'\ m^2$, and distributers $l\ l'\ l^2$, arranged in sets or series, one set or series above another, with space above and below each set or series for the passage of air to the central air space, passage, or chamber, and a set or series of annular collecting-trays, $n\ n'\ n^2\ n^3$, receiving material falling from annular distributers, with sweepers $p\ p'\ p^2\ p^3$ and spouts $o\ o'\ o^2\ o^3$, the whole constructed, arranged, and operating substantially as hereinbefore described and shown, for the purpose specified.

F. THOMPSON.
WM. HENRY WILLIAMSON.

Witnesses:
J. E. JOWITT,
J. FARNDALE,
*Both of Wakefield.*